US005928521A

United States Patent [19]

Levec

[11] Patent Number: 5,928,521

[45] Date of Patent: Jul. 27, 1999

[54] ARRANGEMENT AND PROCESS FOR OXIDIZING AN AQUEOUS MEDIUM

[75] Inventor: Janez Levec, Ljubljana, Slovenia

[73] Assignees: Mannesmann Aktiengesellschaft, Düsseldorf, Germany; K.T.I. Group B.V., Zoetermeer, Netherlands

[21] Appl. No.: 08/945,534

[22] PCT Filed: Mar. 27, 1996

[86] PCT No.: PCT/DE96/00592

§ 371 Date: Oct. 6, 1997

§ 102(e) Date: Oct. 6, 1997

[87] PCT Pub. No.: WO96/31442

PCT Pub. Date: Oct. 10, 1996

[30] Foreign Application Priority Data

Apr. 5, 1995 [SI] Slovenia ................................ 9500109

[51] Int. Cl.[6] ........................................................ C02F 1/72

[52] U.S. Cl. ....................... 210/758; 210/195.1; 210/205; 210/761; 210/765; 210/908; 261/76

[58] Field of Search ................................ 210/194, 195.1, 210/198.1, 205, 758, 759, 760, 761, 765, 908; 261/76

[56] References Cited

U.S. PATENT DOCUMENTS

| | | | |
|---|---|---|---|
| 3,655,343 | 4/1972 | Galeano | 210/758 |
| 3,928,199 | 12/1975 | Kirk et al. | 210/758 |
| 4,417,985 | 11/1983 | Keane | 210/758 |
| 4,648,973 | 3/1987 | Hultholm et al. | 210/758 |
| 4,853,136 | 8/1989 | Roussel et al. | 210/761 |
| 5,106,513 | 4/1992 | Wong | 210/761 |
| 5,358,646 | 10/1994 | Gloyna et al. | 210/205 |
| 5,409,672 | 4/1995 | Cetinkaya | 422/189 |
| 5,614,087 | 3/1997 | Le | 210/761 |

*Primary Examiner*—Jay H. Woo
*Assistant Examiner*—Betsey J. Morrison
*Attorney, Agent, or Firm*—Cohen, Pontani, Lieberman & Pavane

[57] ABSTRACT

The present invention relates to a process and apparatus for oxidizing an aqueous medium, which contains organic and/or oxidizable inorganic substances, at an increased temperature and an increased pressure for reducing the chemical oxygen demand of the aqueous medium to a predetermined desired level. The aqueous medium is introduced into a tubular reactor with an oxygen-containing medium. The tubular reactor contains a mechanism for dispersing bubbles of gaseous oxygen. The reactor contains sections through which the mixture of aqueous medium and oxygen containing medium serially flows. A degree of back-mixing in any one of the sections is equal to or less than the degree of back-mixing of an upstream section and the farthest downstream section has a smaller degree of back-mixing than the farthest upstream section.

41 Claims, 9 Drawing Sheets

5
II
4
4
18
17
8
6
21
1
I
32
4
9
3
2
31
AQUEOUS MEDIUM
7
30
OXYGEN-CONTAINING MEDIUM 8
19
16
I
21
4
5
II
1
4
6
2
9
3
20
18
7

FIG. 5a1
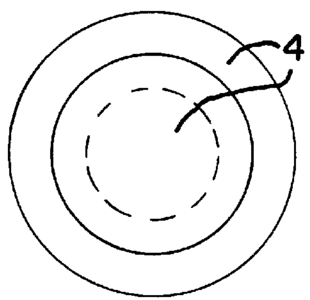
FIG. 5a2
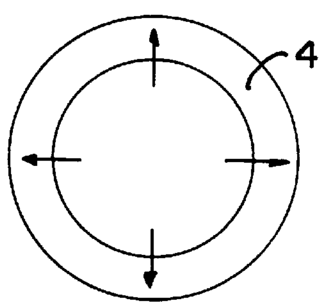
FIG. 5a3
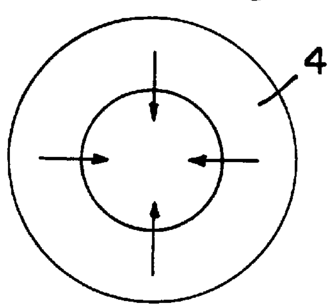
FIG. 5b1
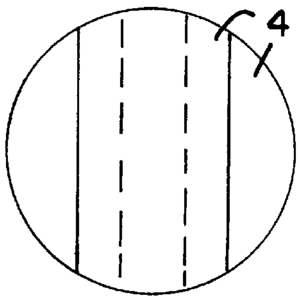
FIG. 5b2
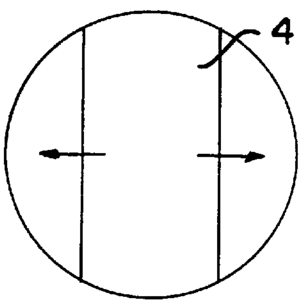
FIG. 5b3
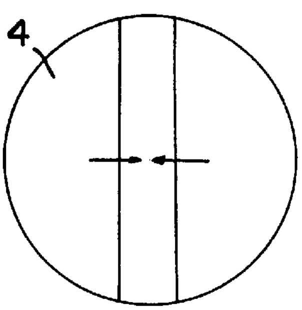

5
4
1
II
I
6
7
9
3
2

5
4
1
2
3
10
II
I
6
8
7
24

5
1
25
11
4
3
2
II
I 4
1
5
3
11
25
2
II
I 4
1
5
3
11
25
2
II
I

ARRANGEMENT AND PROCESS FOR OXIDIZING AN AQUEOUS MEDIUM

FIELD OF THE INVENTION

The invention relates to an arrangement and a process for oxidizing an aqueous medium.

BACKGROUND OF THE INVENTION

Wet oxidation is oxidation that takes place in the aqueous phase of organic and inorganic materials dissolved or suspended in an aqueous medium. This process occurs at an increased temperature and increased pressure in the presence of oxygen, which can be added in the form of a molecular oxygen, a gas containing ozone (e.g., air) or a solution that gives off oxygen (e.g., hydrogen peroxide). The purpose of wet oxidation is to reduce the chemical oxygen demand (COD) of the aqueous medium. To successfully conduct wet oxidation, two essential processes must be kept in mind.

The first process is a continuous transition of the oxygen from the gaseous into the liquid phase (mass transition). An adequate concentration of oxygen in the liquid phase must be maintained at all times, so that the wet oxidation reaction can proceed. The importance of the continuous transition of oxygen from the gaseous into the liquid phase is best illustrated by comparing the equilibrium concentration of oxygen in pure water at the temperatures and pressures usual during wet oxidation to the typical COD values of an aqueous medium to be treated by wet oxidation: The equilibrium concentration equals less than 1 g/l, while the typical COD value is in the range of 30 to 100 g/l. This means that in a wet oxidation system, a quantity of oxygen at least 30 times as large as the equilibrium must normally pass from the gaseous into the liquid phase to obtain the desired COD reduction. An efficient wet oxidation system must therefore constantly maintain a large zone for gas/liquid transition as well as high gas/liquid transition coefficients in the total reactor volume. Means for efficient dispersion, for breaking and distributing the gas bubbles in the total reactor volume, are thus of central importance in a wet oxidation system. If such means do not exist, zones undersupplied with oxygen will form inside the wet oxidation reactor, especially if the oxidation reaction proceeds rapidly and the dissolved oxygen is quickly consumed. Because wet oxidation will not proceed in zones undersupplied with oxygen, the result is a reduction in the effective reactor volume.

The second important process that must be taken into account is the inherent kinetic process of the oxidation reaction itself. The oxidation rate, as reported in the literature (cf. Li et al., AlChE Journal, Vol. 37, No. 11, 1991, pp. 1687–1697), depends in the first order both on the concentration of dissolved organic and oxidizable inorganic materials and on the concentration of dissolved oxygen. The expert can easily grasp that the positive order of oxidation kinetics requires the use of reactors with a low degree of back-mixing. In wet oxidation, the degree of the back-mixing in the liquid phase is especially important, because it is in the liquid phase that the organic and oxidizable inorganic material is present and the oxidation reaction takes place. A low degree of back-mixing means that a smaller total reactor volume is required to attain the desired degree of oxidation of these organic and oxidizable inorganic materials.

In summary, it can be said that an efficient gas/liquid mass transition (gaseous oxygen into the aqueous phase) in a reactor that is operated with a low degree of back-mixing in the liquid phase permits a smaller and more compact oxidation reactor to achieve a desired COD value. In light of the high pressure used during wet oxidation, this represents a remarkable advantage in comparison to less efficient systems.

A relatively effective system for gas/liquid transition is proposed in U.S. Pat. No. 3,870,631. That document describes the use of strong mixing to attain efficient contact between the aqueous phase and the gaseous phase containing oxygen. Mixing is attained by rapidly rotating stirring mechanisms, which are driven from outside of the reactor. The energy consumption and difficulties in sealing the drive shafts are significant disadvantages of this system.

U.S. Pat. No. 4,793,919 describes an alternative that consumes less energy. This alternative calls for an apparatus with a pump for circulating the aqueous suspension of the material to be oxidized through an arrangement of static mixers. The static mixers comprise a large number of guiding devices arranged in the reaction zone. Along with this reaction zone, the apparatus has a zone for the internal recirculation of the mixture. In this recirculation zone, there is a much less intensive mass transition regime (gas/liquid), because the recirculation zone contains no static mixing devices. The internal circulation of the mixture is maintained by the pump and by the buoyancy forces created by introducing a gas that contains oxygen into a zone of the reactor separate from that into which the aqueous suspension is introduced.

In the two systems described above, the intensive mixing and internal recirculation needed to improve the mass transition characteristics of the system inevitably result in a high degree of back-mixing in the aqueous phase. This in turn leads to large reactor volume, which is required for the desired reduction of the COD value. In the past, the solution to this problem has usually been seen in connecting two or more reactors in series, one behind the other, with a high degree of back-mixing. Such an arrangement is also proposed in the two aforementioned patents.

SUMMARY OF THE INVENTION

The object of the invention is to propose an arrangement and a process for oxidizing an aqueous medium that contains organic and/or oxidizable inorganic materials, whereby the smallest possible reaction space volume should be required for reducing the COD value to a preset limit value.

The disadvantages of the processes and devices according to the prior art can be avoided to a great extent by the present invention. The expert can grasp that in a process with a kinetics of positive arrangement, the entire reactor volume in a series of well-mixed reactors is clearly lower than the volume of a single well-mixed reactor that offers the same output. In the case of wet oxidation, however, even a serial arrangement of well-mixed reactors itself always leads to a very large total reactor volume. Assume that wet oxidation (in an irreversible reaction of the (psuedo) first order) is carried out in a reactor with a very high degree of back-mixing, such as in a continuously stirred reactor (CSTR). Further assume that the COD value of the input flow corresponds to a typical value of 70 g/l and that the sojourn time (which is related to the volume of the reactor) is selected in such a way that 90% of the COD value (i.e., 63 g/l) is decomposed in the reactor. The COD value of the effluent is then 7 g/l. After this, this effluent is fed into another reactor operated in the same way at the same temperature and the same pressure. Once again, 90% of the COD value is to be decomposed in the second reactor (i.e., 6.3 g/l.). As a result, the COD value of the effluent equals 0.7 g/l. In each case, a 90% reduction is achieved in the COD value of the input flow. In the case of the first reactor, however, 63 g/l of oxygen is needed, while in the case of the second reactor only one-tenth of this amount is required. It is thus clear that in the second reactor a much less intensive mass transition regime from the gaseous to the liquid phase is needed. According to the embodiments mentioned above, such a less intensive mass transition regime can be achieved in a reactor with a low degree of back-mixing. It follows that the second reactor can be significantly smaller, without necessitating decreases in output. For the above example, this means that when the first reactor is, for example, of the CSTR type or a type similar thereto (with a maximum degree of back-mixing) and the second reactor has no back-mixing at all in the aqueous phase (reactor with plug flow), the required reactor volume for the second reactor is equal roughly to only one-fourth of the volume of the first reactor. The result is a smaller and more compact system.

The expert will see that similar conclusions can be drawn in the case of a series of more than two reactors arranged one behind the other. In a series of more than two reactors, as in a series of two, less and less stringent conditions of mass transition are needed as more and more reduction of the COD value is achieved by the aqueous medium flowing through the reactors. These less stringent conditions require a lower degree of back-mixing, so that, in response, a much smaller total reactor volume results than in the case of a series of identical strongly mixed reactors.

The expert also knows that in practice, every chemical reactor has a certain degree of back-mixing. A bubble column reactor with gas/liquid flowing up synchronously is a simple reactor frequently used for gas/liquid reactions, including wet oxidation. Nonetheless, this reactor has a quite significant degree of back-mixing in the liquid phase. This back-mixing is caused mainly by the internal recirculation of the liquid phase caused by a local upward flow of the liquid. The extent of this internal recirculation depends on many factors, such as the geometry of the reactor column (recirculation occurs more strongly in columns with a large diameter/length ratio, for instance), the properties of the liquid, and the operating conditions, such as the gas and liquid throughput rates. Another disadvantage of a typical bubble column reactor is what is called the "bypassing" of/by the reaction mixture, which may occur in a zone near the center of the column. For this reason, bubble column reactors are frequently equipped with lateral baffles, which consist of more or less flat and relatively thin plates and are arranged at substantially a right angle to the direction of flow.

The lateral flow baffles minimize more than bypassing. They can also significantly reduce the recirculation of the liquid phase in the bubble column reactor. Commonly used flow baffles in the form of disks and rings ("donuts") can very effectively prevent, when advantageously sized and positioned, the downward flow of the liquid phase. Such baffles can thus clearly reduce back-mixing in the bubble column reactor. In columns with a larger diameter/length ratio, the use of longitudinal baffles arranged substantially parallel to the throughput direction and extending over practically the entire length of the column can reduce the equivalent diameter/length ratio and thus the internal recirculation. As a result, the degree of back-mixture in the column is reduced as well. The use of flow baffles of advantageous size and position can therefore significantly improve the output of the bubble column reactor for reactions of the positive order.

In addition to the reduced mixing, the constant collisions between the lateral flow baffles and the upwardly flowing mixture of aqueous medium and bubbles of oxygen-containing gas lead to an efficient dispersion, caused by the bubbles of the oxygen-containing gas breaking open and mixing. The effectiveness of the dispersion depends on various factors the shape and position of the baffle surface, the diameter of the column, the properties of the liquid and, especially, the intensity of the collisions between the flowing mixture and the baffles. The intensity of these collisions depends primarily on the speed of the flowing mixture relative to the flow baffles. For a given reactor volume, the speed of the mixture flowing out depends on the sojourn time required to obtain the desired reduction in COD value. The speed can be increased by feeding back a portion of the reactor effluent to the inlet of the reactor. In this way, the speed of the mixture relative to the flow baffles can be increased considerably.

The expert is aware that feeding back a portion of the reactor effluent to the inlet of the same reactor causes a greater degree of the back-mixing in the reactor. This increase depends primarily on the amount of reactor effluent that is fed back. However, it is important to note that by varying the proportion of recycled effluent, it is possible to optimally adjust the degree of back-mixing and the intensity of interactions between the out-flowing mixture and the flow baffles to the requirements of a given situation. This opportunity to fine tune the operating conditions leads to a clear reduction in reactor volume.

For the expert, it is self-evident that back-mixing in the liquid phase can be controlled and, simultaneously, an efficient mixture of the bubbles of oxygen-containing gas and the aqueous phase can be attained by the use of other reactor fittings than the aforementioned lateral and longitudinal flow baffles. For example, wire nets or perforated plates, which have a diameter substantially equal to the inner diameter of the column and are arranged substantially parallel to each other and at substantially a right angle to the longitudinal axis of the column, can perform the same function as lateral flow baffles. In columns with a large diameter/length ratio, wire nets and perforated plates can also be used in combination with the longitudinal baffles described above. Different types of static mixers developed especially for gas/liquid mixtures represent another alternative for reactor fittings that can advantageously substitute for lateral and longitudinal flow baffles. For example, the three-dimensional structures of a static mixer developed by Sulzer efficiently disperse the bubbles of the oxygen-containing gas and the aqueous phase and, at the same time, considerably reduce back-mixing in the liquid phase. Of course, other types of fittings are also possible without departing from what is essential to the present invention. In this connection, the use of stirring mechanisms must also be mentioned, as known from the prior art. An efficient dispersion can also be produced in that the recycling loop, with which a portion of the effluent is fed back, opens into the reactor in the form of an ejector and at least a portion of the oxygen-containing gas is introduced through this ejector. It is also possible to direct the flow of liquid from the recycling loop counter to the flow of the sprayed-in oxygen-containing gas and in this way divide the gas into the finest gas bubbles.

The selection of the type or types of reactor fittings for a specific application depends on various factors. The two most important factors are the required output and the composition of the aqueous medium. For example, fittings that tend to clog, such as wire nets or some types of static mixers, should not be used when solid particles are suspended in the aqueous medium.

An essential characteristic of the present invention is that oxidation of the aqueous medium is carried out in a reactor that is subdivided into several reactors, also referred to hereinafter as sections. The individual sections are operated such that the degree of back-mixing in a given section is no greater than the degree of back-mixing in the sections located upstream from that given section. The last section, which is located farthest downstream, always has a lower degree of back-mixing than the upstream (first) section. Preferably, the degree of back-mixing declines from section to section in the direction of flow. The individual sections can be located in separated housings that are connected to each other by suitable tubular conduits. In the case of one common housing for several sections, it is recommended that these sections be separated by separators, such as honeycomb elements, wire screen bottoms or hole plates. Such separators should allow a free mass transfer, but only a limited transfer of rotational flows.

BRIEF DESCRIPTION OF THE DRAWINGS

In the drawings, wherein like reference numerals denote similar elements throughout the several views:

FIG. 5*a*1 shows an embodiment of a lateral flow baffle for a reactor of the present invention;

FIGS. 5*a*2 and 5*a*3 respectively show the two different parts of the flow baffle of FIG. 5*a*1;

FIG. 5*b*1 shows another embodiment of a lateral flow baffle for a reactor of the present invention;

FIGS. 5*b*2 and 5*b*3 respectively show the two different parts of the flow baffle of FIG. 5*b*1;

DETAILED DESCRIPTION OF THE PRESENTLY PREFERRED EMBODIMENTS

Figure 1:
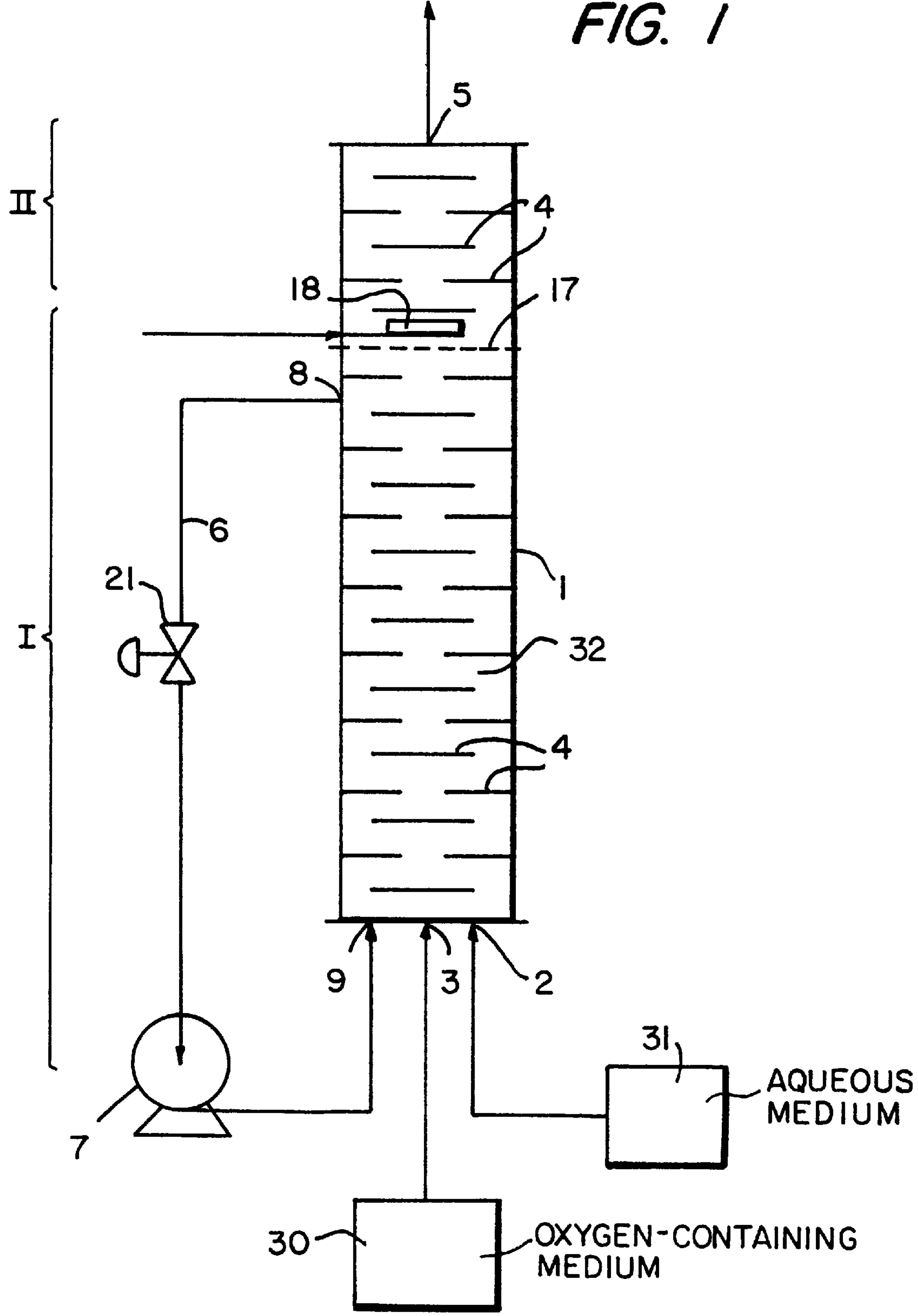
FIG. 1 shows an embodiment of a reactor of the present invention having two sections within a common housing.

FIG. 1 shows, in longitudinal section, a reactor 1 according to the invention for oxidation of an aqueous medium 31 containing organic and/or oxidizable inorganic materials. At increased temperature and increased pressure, oxygen is added to the aqueous medium 31 for the purpose of reducing the chemical oxygen demand (COD) of the aqueous medium 31 to a predetermined desired level. This reactor 1 has two sections I, II connected to each other, which are located in a common, preferably vertical, cylindrical housing. The inlet 2 for aqueous medium 31 to be freshly treated is arranged in the first section I, which is farthest upstream. An inlet 3 for an oxygen containing medium 30 is likewise arranged in the first section I. The oxygen containing medium 30 may be, but is not necessarily limited to, air, oxygen enriched air, pure oxygen, ozone, or a solution which releases oxygen such as hydrogen peroxide.

The inlets 2, 3 are located in the bottom of the reactor 1 or in the vicinity of the bottom. An outlet 5 for the treated medium is advantageously arranged at the tip of the downstream (last) section II. The first section 1, according to an advantageous embodiment of the invention, includes a recycling loop 6, through which a portion of the mixture 32 (that runs from bottom to top through section I) of the supplied aqueous medium 31 and the added oxygen-containing medium 30 can be fed back from the transition region between section I and II to the input of Section 1. The outlet of the recycling loop 6 is identified by 8 and the inlet of the loop 6 into the reactor is identified by 9. The recycling flow is maintained by a pump 7 and its amount is adjustable by a suitable valve 21. Arranged in both sections I, II are bubble dispersing elements 1 for dispersing the bubbles of the oxygen-containing medium 30. The bubble dispersing elements 4 are embodied in the form of lateral flow baffles, which stand at a right angle to the bottom-to-top flow direction of the mixture 32. As a result, collisions of this mixture with the flow baffles occur constantly, so that the contained gas bubbles are finely distributed and the mass transition of the oxygen into the aqueous phase (i.e., the dissolution of the oxygen) is favored. Advantageous embodiments for lateral flow baffles of this type are shown in FIG. 5. FIG. 5*a*1–5*a*3 show an embodiment having disks and donuts of thin sheet metal, which are arranged alternately and separately one above the other. FIG. 5*b*1–5*b*3 show another variant, in which alternating slots are provided in the flow baffles on the sides in the middle area. As a result, the upward flow is accordingly divided and run back together over and over. Compared to a reactor without lateral flow baffles, the degree of back-mixing in the liquid phase is reduced. On the other hand, however, the degree of back-mixing is increased by the recycling loop 6. Even so, the recycling loops 6 makes it possible to set the flow speed of the mixture 32 in section I so high that an effective suspension of the gas bubbles is attained without falling below the sojourn time of the aqueous medium 31 in this section I that is required to attain the desired reduction in COD value. In an advantageous embodiment of the invention, a separator 17 is arranged in the transition area from section I to section II. The separator 17 separates the two immediately adjacent sections I and II from each other in such a way that a free mass transfer is possible between the two sections, but only a limited rotational pulse transfer occurs with the flow. The flow in the transition area between the two sections I, II is thus directed only vertically upward (or downward, as applicable). All other flow directions are suppressed to the greatest possible extent. The separator 17 consists advantageously of one or more hole plates, whose holes are distributed evenly and have a diameter equal to only a small fraction of the inner diameter of the tubular reactor 1. Alternatively, the separator 17 may consist, for example, of one or more wire screen bottoms, whose screen hole width is equal to only a small fraction of the inner diameter of the tubular reactor 1. The outer diameter of the separator 17 is approximately as large as the inner diameter of the tubular reactor 1. By means of the separator 17, different throughput ratios can be established in the individual sections I, II. In the present case, the flows are mixed intensively in section I, while in the upper section II a relatively uniform upward flow exists. When several hole plates or wire screen bottoms as are used as the separator 17, these should be arranged parallel to each other and at a distance from each other of not more than 20 cm. In some cases, it is advantageous to use honeycomb elements as separators 17; the size and arrangement of which should correspond to that of the hole plates or wire screen bottoms. However, the separator 17 can also comprise static mixers, whose diameter is substantially equal in size to the inner diameter of the tubular reactor 1 and whose thickness relative to their diameter is small. Such static mixers are directed at substantially a right angle to the reactor longitudinal axis. The example shown in FIG. 1 also has the same or similar bubble dispersing element 4 in section II for dispersing bubbles of the oxygen-containing medium 30 and reducing the back-mixing of the aqueous phase. Of course, different bubble dispersing elements 4 may also be installed in the respective sections I and II for the purpose of dispersion. It should also be noted that, in advantageous further development of the invention, at the beginning (lower end) of section II, an additional inlet 18 is arranged for the introduction of an oxygen-containing medium 30. This improves the opportunity for oxygen absorption through the liquid phase.

It is essential to the invention that the degree of back-mixing in the aqueous phase in section II be clearly smaller than in section I, because section II has no recycling loop. Because the required performance in reducing the COD value of the aqueous phase is substantially smaller in section II than in section I, the sojourn time of the aqueous medium in section II can be kept correspondingly shorter. For this reason, the container volume of section II is clearly smaller than that of section I. By regulating the recycling flow, it is possible to change the degree of back-mixing of section I within wide limits and thus optimize it for a particular case as needed.

Figure 2:
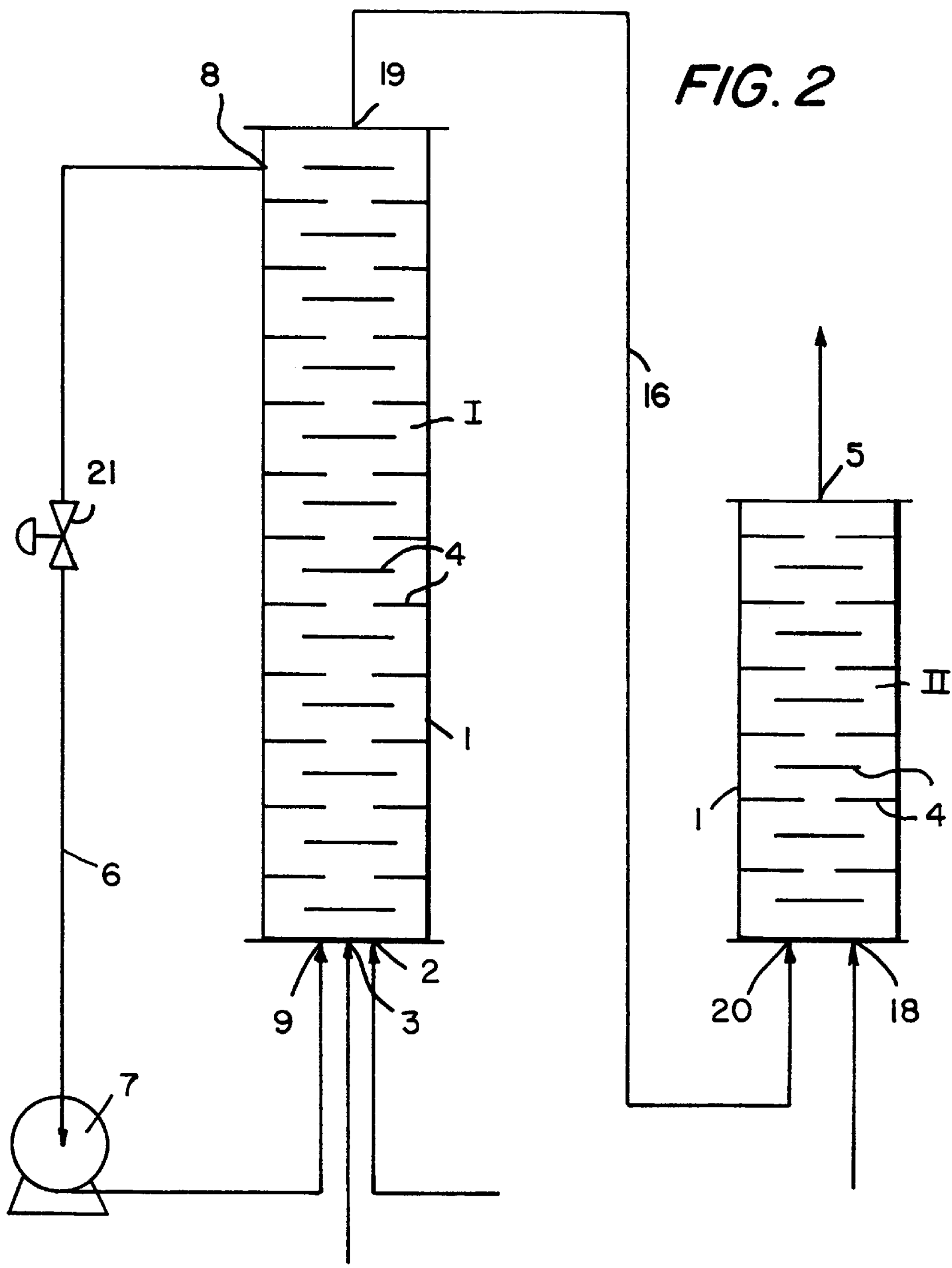
FIG. 2 shows another embodiment of a reactor of the present invention with two sections in separate housings.
Figure 3A:
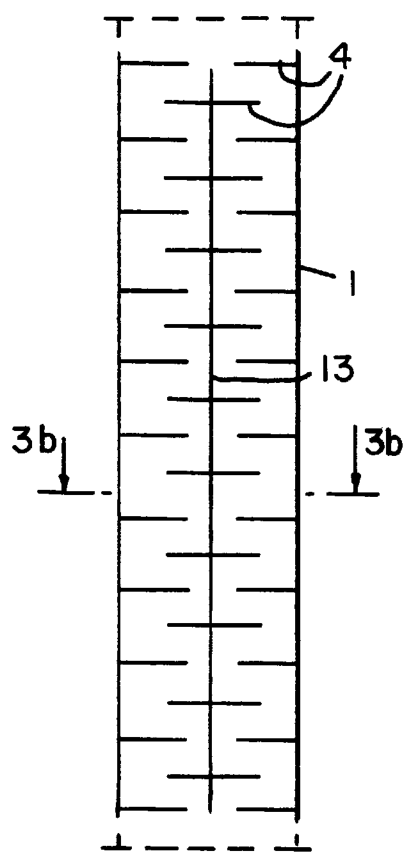
FIGS. 3A and 3B show a reactor section with separating walls in the longitudinal direction.
Figure 3B:
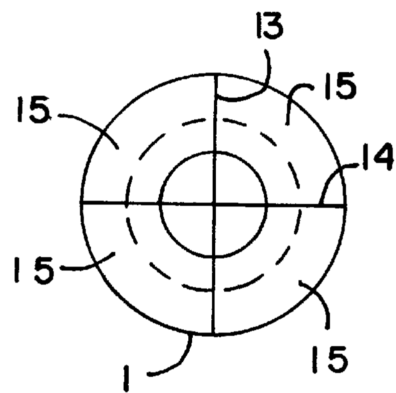
Figure 4:
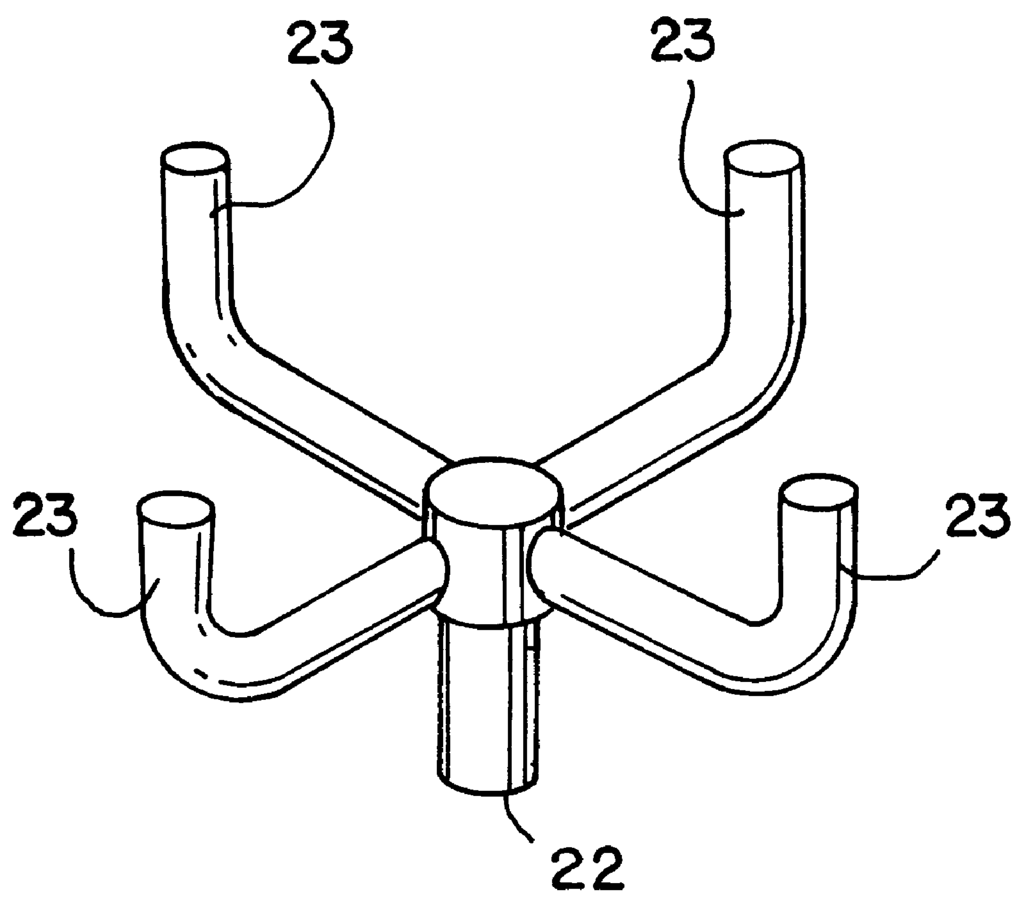
FIG. 4 shows a combination inlet with a distributor for use with the reactor of FIGS. 3A and 3B.

Instead of the types of lateral flow baffles shown in FIGS. 5*a*1–5*a*3 and 5*b*1–5*b*3, it is naturally possible to use other fittings as means for dispersion in the tubular reactor 1. For example, wire screen bottoms, hole plates or arrangements of static mixers can be used for this purpose. These different means to achieve dispersion and reduce the degree of back-mixing in the liquid phase can also be advantageously combined with each other in one reactor. In the case of reactors with a large inner diameter, it is recommended that additional flow baffles directed parallel to the reactor longitudinal axis be used. These additional baffles should extend as far as possible across the entire reactor length. In this way, the equivalent diameter/length ratio and the degree of back-mixing in the reactor can be substantially reduced toward more favorable values. A schematic depiction of such a reactor 1 is shown in FIGS. 3*a* and 3*b*. The inner vertical separating walls 13, 14 extend parallel to the reactor longitudinal axis and divide the reactor interior into four parallel subsections 15 with barriers between them. Especially in such a case, it is advisable to provide a common inlet into the first section for at least two, and preferably for all three, of the following media flows; the freshly added aqueous medium 31, the oxygen containing medium 30 and, as needed the recycling flow of the recycled portion of the mixture 32. The common inlet serves to achieve pre-mixing of the media flows. If recycling of the suspension is planned, of course, each of the parallel subsections 15 must be equipped with a suitable recycling loop. A combined inlet for all three media flows, suitable for reactor 1 as in FIG. 3, is shown in FIG. 4. The media feed line 22 for the three premixed media branches off (in keeping with the number of subsections 15) into four distributor lines 23, each of which opens into one of the subsections 15. Such a combined inlet has the advantage that relatively intensive pre-mixing of the media flows occurs from the start, and the quantities distributed to the respective subsections 15 are uniform. In the same way, a similarly designed combined outlet (not shown) may be provided for the discharge of the effluent from the subsections 15. Of course, separating walls running in the longitudinal direction of the reactor can be combined as desired, in the framework of the invention, with the various means for dispersing the gas bubbles.

FIG. 2 shows a modification of the reactor 1 in FIG. 1. The particular difference is that the two sections I and II of the reactor, in this case, are located in separate housings, which are connected to each other by a connecting tube line 16. The outlet from section I is identified by 19 and the inlet of the connecting tube line 16 into section II is indicated by 20. In this variant, again, an additional inlet 18 can be provided for an oxygen containing medium.

Figure 6:
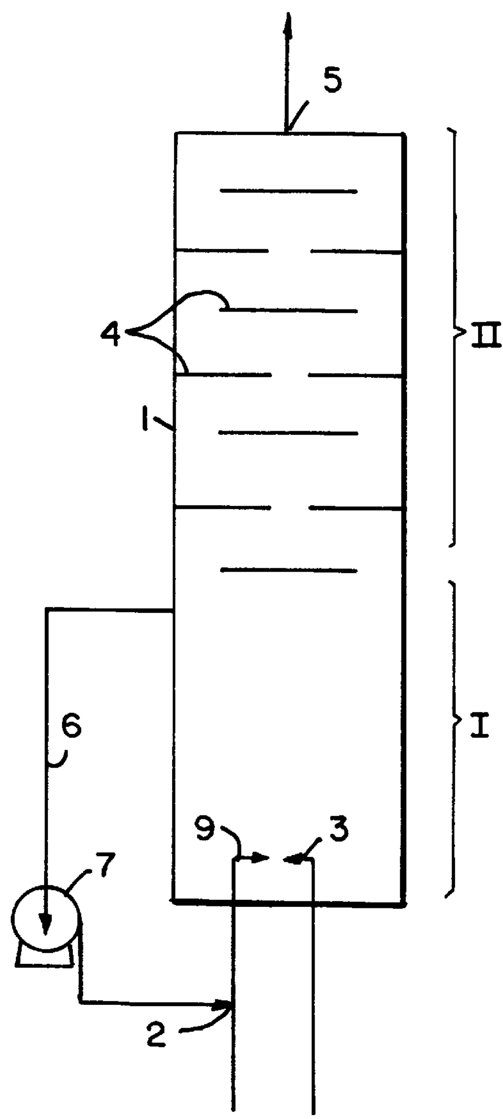
FIG. 6 shows another embodiment of a reactor of the present invention in which the flows of the aqueous medium inlet and the oxygen containing medium inlet are directed toward each other.

FIG. 6 also shows, in schematic longitudinal section, a tubular reactor 1 having two sections I, II. Its first section I has no lateral flow baffles or other bubble dispersing elements 4 comparable to those in FIG. 1 or FIG. 2. Such bubble dispersing elements 4 are provided here only in section II. However, section I again has a recycling loop 6. The inlet for aqueous medium 2 is connected to the recycling loop 6 so that it enters the reactor 1 indirectly via the recycling inlet 9. In order to ensure an intensive mixture of the gas bubbles of the oxygen-containing medium 30 with the aqueous medium 31 despite the absence of flow baffles, the recycling flow (including the aqueous medium 31) and the flow of the oxygen-containing medium 30 are sprayed-in toward each other at high speed in the lower part of section I. The recycling inlet 9 of the recycling loop 6 and the inlet 3 for the containing medium 30 are located at a close distance to and diametrically across from each other. Their spray-in directions are preferably arranged coaxially. The spray-in liquid stream from recycling inlet 9 causes the sprayed-in medium from inlet 3 to divide intensively into the finest gas bubbles.

Figure 7:
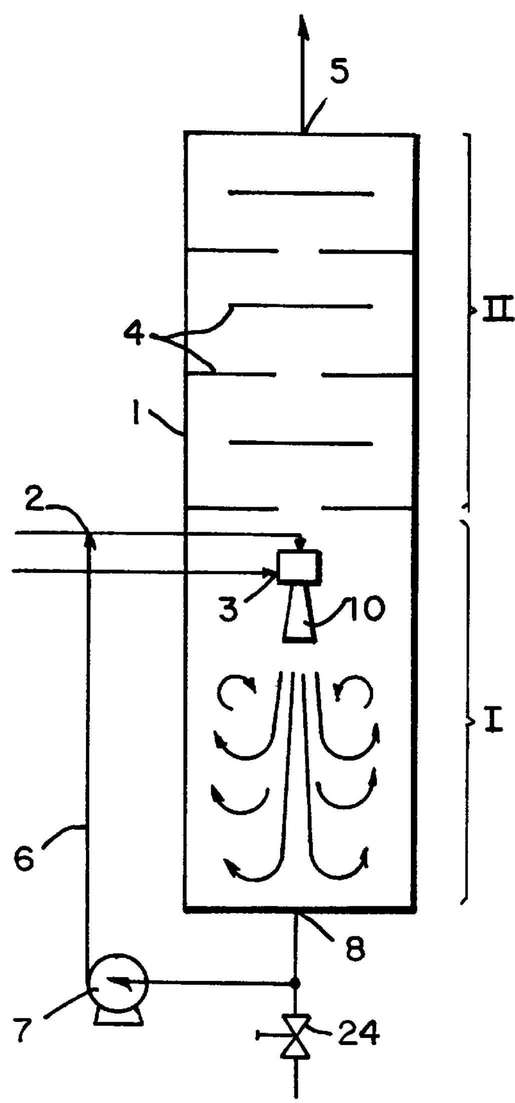
FIG. 7 shows another embodiment of a reactor of the present invention having an injector in the first section.

Another variant of the invention is shown in FIG. 7. Here, too, the tubular reactor 1 differs in section I from the reactor shown in FIG. 1. In this case, the outlet 8 for discharge of the mixture 32 to the recycling loop 6 for feeding back into section I does not occur in the upper part, but rather in the lower part of section I where the outlet 8 is arranged. In the reverse of the variant shown in FIG. 1, the recycling inlet 9 of the recycling loop 6 is arranged in the tubular reactor 1 in the upper part of section 1. A further special characteristic is that the recycling inlet 9 of the recycling loop 6 is embodied as the ejector 10, via which not only the recycling flow, but also at least a portion of the oxygen-containing medium 30 (inlet 3) is introduced. The outflow device of the ejector 10 is advantageously directed counter to the throughput direction of the reactor 1, and causes intensive mixing of the contents of section I, as indicated by the arrows. Thus, an efficient dispersion of the gas bubbles is ensured in the aqueous phase. The ejector 10 and the outlet 8 lie across from each other. The inlet 2 for fresh aqueous medium 31 is, again, not attached directly to section I, but instead connected indirectly via the recycling loop 6 to the reactor 1. An outlet valve 25 through which the reactor 1 can be emptied as needed is connected at a bottom of the reactor 1.

Figure 8:
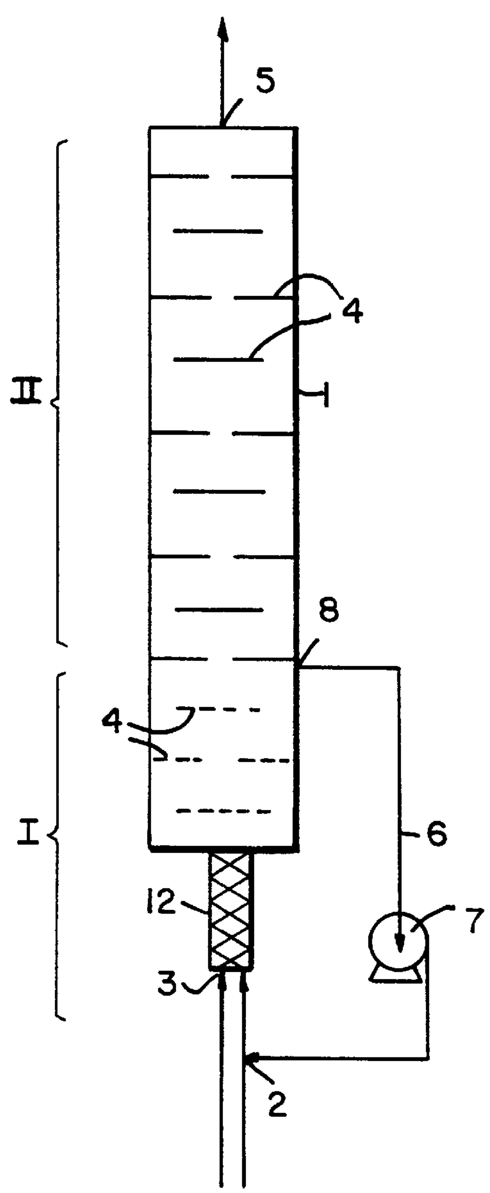
FIG. 8 shows another embodiment of a reactor of the present invention with a static mixer externally connected to the reactor.

The embodiment as in FIG. 8 also differs from that in FIG. 1 only in the first section I. In this case, the three media flows (the fresh aqueous medium, 31 the oxygen-containing medium 30 and the mixture 32 in the recycling flow) are introduced commonly through a static mixing device 12 attached below the reactor 1. The bubble dispersing elements 4 indicated in section I by the dashed lines can, as desired, serve as additional means for promoting the dispersion of the gas bubbles in the aqueous medium, but are not absolutely necessary.

Figure 9:
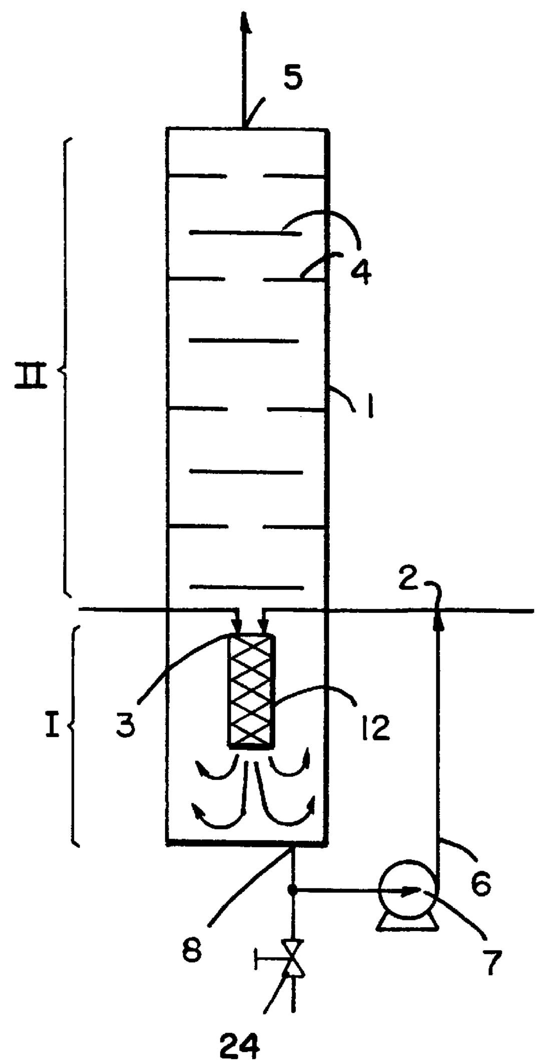
FIG. 9 shows another embodiment of a reactor of the present invention with a static mixer internally mounted in the reactor.

FIG. 9 shows a modification of the variants in FIG. 8. In this case, the static mixer 12, through which all three medium flows are introduced into section I, is arranged in the interior of said section I. The outflow direction of the static mixture 12 is directed, as in the variant with the ejector 10 in FIG. 7, counter to the throughput direction of the reactor 1, from above to below.

Figure 12:
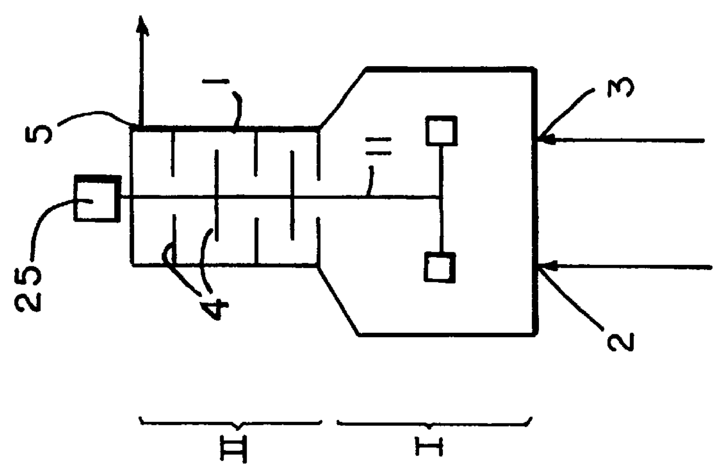
FIGS. 10–12 show embodiments of a reactor of the present invention with mechanical mixing elements in a first section of the reactor.
Figure 11:
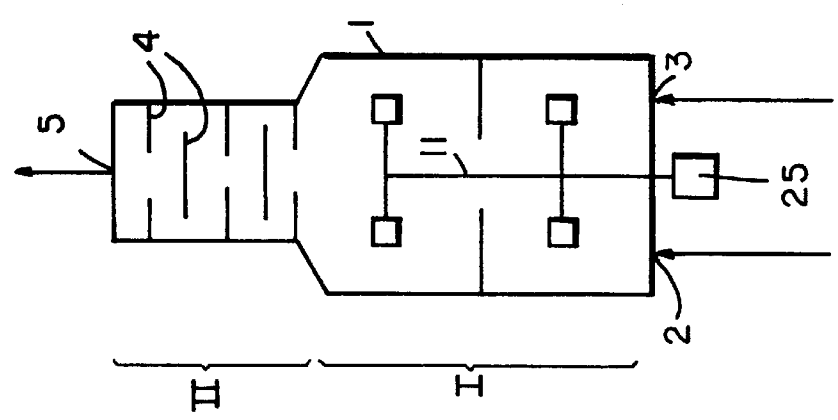
Figure 10:
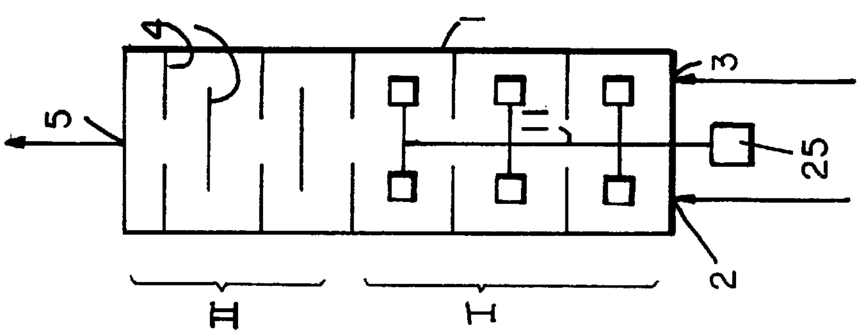

The embodiments in FIGS. 10 to 12 also show reactors 1 with two sections I, II. In each embodiment of FIGS. 10 to 12, section I has no recycling loop, but instead is equipped with a mechanical stirring mechanism 11 driven by an electric motor 25. In FIG. 10, the mixing tools operate on three planes, which are advantageously separated from each other by lateral flow baffles. In FIG. 11, two mixing planes are provided for section I. In FIG. 12, there is only one. While the drive shafts of the stirring mechanisms 11 in FIGS. 10 and 11 run downward from the reactor 1, in FIG. 12 the reverse is true.

Figure 13:
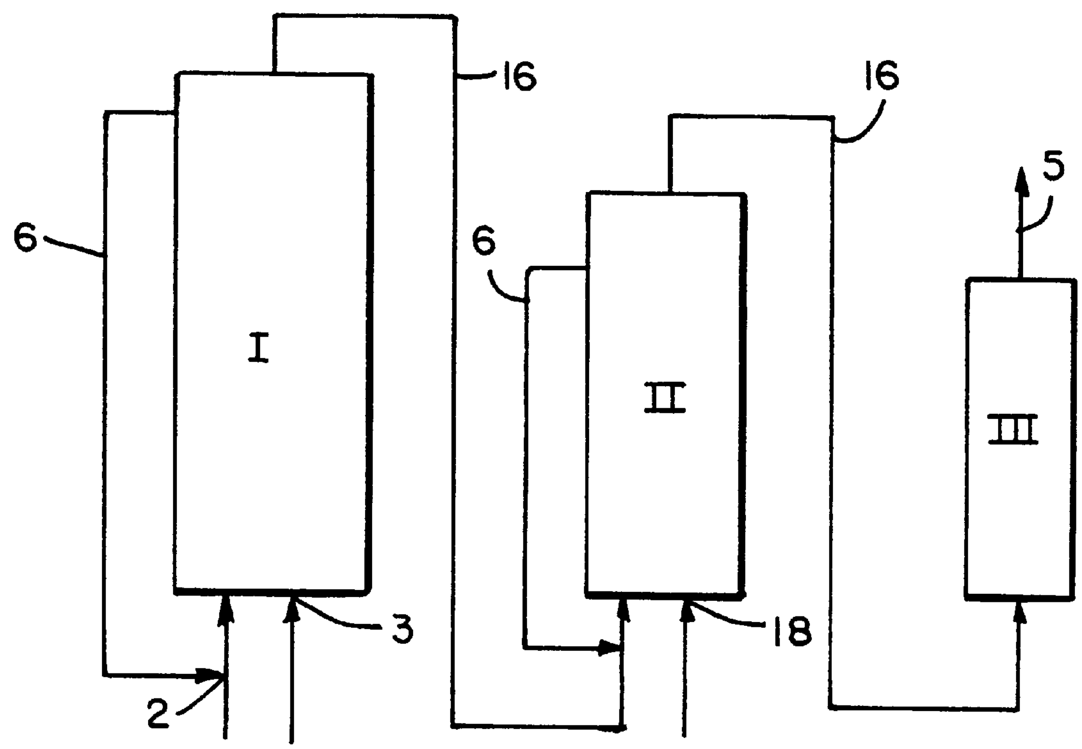
FIG. 13 shows yet another embodiment of a reactor of the present invention including three sections, each in a separate housing.

Finally, FIG. 13 schematically shows an example of a reactor according to the invention with three sections I, II, III. Each section I, II, III is arranged in a separate housing. Only sections I and II are equipped respectively with a recycling loop 6. It is characteristic of the individual sections (as in the variants in FIGS. 1, 2 and 6 to 12) that the degree of back-mixing is smaller in the last section III than in the first section I, and that the degree of back-mixing in any downstream section II, III is no higher, and is preferably smaller, than in all sections I or II located upstream relative thereto. Given this prerequisite of back-mixing that declines in degree in the throughput direction, the required volumes for the individual sections can gradually become many times smaller, as already indicated in FIG. 13. However, cases are also easily possible in which, as roughly shown in FIG. 1, the first section I is larger than the section II located downstream. As a rule, the internal volumes of the respective sections are different. The optimal layout depends on the type of aqueous medium 31 to be processed and the operating conditions. The volume ratio between two consecutive sections depends, in particular, on the effectiveness of the mass transition from the gaseous into the liquid phase, on the actual degree of back-mixing in the sections and, of course, on the desired extent of reduction in COD values in each particular section. Advantageously, the final section should be embodied as a vertical bubble column reactor, in which the aqueous medium and the gas containing oxygen run from below to above synchronously. In general, reactors according to the invention with two or three sections already allow extraordinarily strong reduction of the COD value in the effluent. However, it is also possible in the framework of the invention to connect any desired number of sections one after the other. What does not change, regardless of the size of the individual sections, is that the total volume of a reactor according to the invention can be clearly smaller than would be the case in a reactor according to the prior art, given the same degree of decomposition for the pollutants to be treated.

In a preferred embodiment of the invention, the bubble dispersing elements 4, ejector 10, mechanical stirring mechanism 11, static mixing device 12 used to disperse the oxygen bubbles and to reduce the degree of back-mixing in the liquid phase and/or the separators 17 may be coated with a catalytically active material, which promotes the oxidation of the organic and oxidizable inorganic materials. Specifically, compounds of one or more elements of the group of metals Cr, Fe, Mn and Zn and/or of the oxides of Ce, Cr, Co, Cu, Fe, V, An may be used for this purpose. It is also possible to disperse the catalyst in the aqueous medium or to dissolve it and to run it through the reactor with the liquid phase.

The process according to the invention has already been largely described in connection with the explanation of the drawings. With respect to the parameters of pressure and temperature, the process is such that practically no water vapor is produced in the tubular reactor 1 and the liquid phase is maintained. Preferred temperatures are in the range of 200 to 370° C. Preferred pressures are in the range of 20 to 200 bar. The sojourn time in each section of the reactor is set such that the chemical oxygen demand of the aqueous medium is reduced to a desired value predetermined for that section. In sections with recycling loops, this can be influenced very simply by adjusting the recycling rate. Preferably, most of the material flowing through a section located upstream is fed back again into such a section. It is essential that the upstream sections, especially the first one, be operated at a strong mixing level, so that the most intensive possible mass transition from the gaseous to the liquid phase is achieved. In contrast, the sections located downstream, especially the final section, are to be operated with the lowest possible degree of back-mixing in the liquid phase.

I claim:

1. An apparatus for oxidation of an aqueous medium at an increased temperature and an increased pressure, wherein the aqueous medium comprises at least one of organic and oxidizable inorganic substances and is exposed to oxygen in a reactor for reducing the chemical oxygen demand of the aqueous medium to a predetermined desired level, comprising:

a tubular reactor divided into at least two sections connected one behind the other, each of the at least two sections having a predetermined degree of back-mixing of the aqueous medium;

at least one inlet operatively connected to a farthest upstream of the at least two sections for introducing the aqueous medium and an oxygen containing medium into the tubular reactor;

a bubble dispersing element operatively mounted in at least the farthest upstream of the at least two sections for dispersion of bubbles of the gaseous oxygen in the aqueous medium;

at least one outlet operatively connected to a farthest downstream of the at least two sections for the discharge of the treated aqueous medium;

the at least two sections being arranged such that the degree of back-mixing of the aqueous medium of a particular section of the at least two sections is equal to or less than the degree of back-mixing of another adjacently upstream section; and the degree of back-mixing in the farthest downstream section is less than the degree of back-mixing in the farthest upstream section.

2. The apparatus of claim 1, wherein a longitudinal axis of said tubular reactor is directed vertically.

3. The apparatus of claim 1, wherein the degree of back-mixing in each one of the at least two sections is less than the degree of back-mixing in an adjacently upstream section.

4. The apparatus of claim 1, further comprising at least one recycling loop operatively connected between a downstream end of one of the at least two sections, at a transition area between two adjacent sections, to the upstream end of the one of the at least two sections for introducing a recycled medium back into the one of the at least two adjacent sections.

5. The apparatus of claim 4, wherein an outlet of the tubular reactor for transporting the aqueous medium from the tubular reactor to the recycling loop is connected at the downstream end.

6. The apparatus of claim 4, wherein the inlet of the recycling loop and the inlet for the oxygen containing medium are located directly across from each other in the tubular reactor such that a flow of the oxygen containing medium and the recycled medium are directed toward each other in the tubular reactor thereby dispersing the oxygen containing medium in the recycled medium.

7. The apparatus of claim 4, wherein an inlet for the aqueous medium is connected to the recycling loop such that the recycled medium mixes with the aqueous medium before introduction into the tubular reactor.

8. The apparatus of claim 4, wherein the farthest upstream section has an inlet port for introducing at least two of the aqueous medium, the recycled medium, and the oxygen containing medium.

9. The apparatus of claim 4, wherein the one of the at least two sections is arranged downstream of the farthest upstream section and includes an additional inlet for the introduction of fresh oxygen containing medium connected to the at least one recycling loop such that the recycling medium mixes with the oxygen containing medium before introduction to the tubular reactor.

10. The apparatus of claim 1, wherein said bubble dispersing element comprises a motor driven stirring mechanism.

11. The apparatus of claim 10, wherein said motor driven stirring mechanism comprises a coating of a catalytically active material which promotes the oxidation of the aqueous medium, said coating comprising at least one compound from the group of metals Cr, Fe, Mn, and Zn, and the group of oxides of Ce, Cr, Co, Cu, Fe, V, and Zn.

12. The apparatus of claim 1, wherein said bubble dispersing element comprises a static mixer.

13. The apparatus of claim 1, further comprising a recycling loop having a pump for pumping a portion of the mixed aqueous medium and oxygen containing medium in the reactor from an output port at one of the downstream end and the upstream end of one of the at least two sections to an inlet at the other one of the downstream end and the upstream end, wherein the inlet comprises one of an ejector and a static mixer for introducing the recycled medium back into the one of the at least two sections.

14. The apparatus of claim 13, wherein the inlet is located at a transition area between one section and an immediately downstream section, a flow from the inlet is directed counter to a throughput direction of the tubular reactor, and said outlet is located upstream from the inlet.

15. The apparatus of claim 13, wherein said one of an ejector and a static mixer comprises a coating of a catalytically active material which promotes the oxidation of the aqueous medium, said coating comprising at least one compound from the group of metals Cr, Fe, Mn, and Zn, and the group of oxides of Ce, Cr, Co, Cu, Fe, V, and Zn.

16. The apparatus of claim 1, wherein said at least one inlet is located at a floor of said tubular reactor.

17. The apparatus of claim 1, wherein said at least one outlet is located at a farthest downstream end of the tubular reactor.

18. The apparatus of claim 1, wherein one of the at least two sections comprises a separating wall along the longitudinal axis of said tubular reactor and said separating wall operatively divides the one of the at least two sections into at least two parallel subsections.

19. The apparatus of claim 1, wherein said tubular reactor comprises at least two separate housings, wherein each of said at least two separate housings comprises one of the at least two sections.

20. The apparatus of claim 1, further comprising a housing wherein two immediately adjacent ones of said at least two section are located; and a separator operatively mounted between said two immediately adjacent ones for permitting free mass transfer between said two immediately adjacent ones and for limiting a rotational pulse transfer between said two immediately adjacent ones.

21. The apparatus of claim 20, wherein said separator comprises one of at least one hole plate and at least one wire screen bottom, and said separator having a diameter substantially as large as an inner diameter of said tubular reactor and being arranged at a substantially right angle to the longitudinal axis of said tubular reactor.

22. The apparatus of claim 20, wherein said separator comprises a plurality of ones of hole plates and wire screen bottoms, said separator having a diameter substantially as large as an inner diameter of said tubular reactor, and said plurality of ones being substantially parallel to each other at a distance less than or equal to 20 cm from each other and being arranged at substantially right angles to the longitudinal axis of said tubular reactor.

23. The apparatus of claim 20, wherein said separator comprises a honeycomb element having a diameter as large as a diameter of said tubular reactor, a thickness less than or equal to 20 cm, and being arranged substantially at a right angle to the longitudinal axis of said tubular reactor.

24. The apparatus of claim 20, wherein said separator comprises a static gas and liquid mixer device having a small thickness relative to a diameter of the tubular reactor and being substantially at a right angle to the longitudinal axis of said tubular reactor.

25. The apparatus of claim 1, wherein the volume of each one of the at least two sections differs from others of the at least two sections.

26. The apparatus of claim 1, wherein at least one of the at least two section behind the farthest upstream section includes, at its upstream end, and additional inlet for the introduction of a fresh oxygen containing medium.

27. The apparatus of claim 1, wherein said bubble dispersing element comprises a coating of a catalytically active material which promotes the oxidation of the aqueous medium, said coating comprising at least one compound from the group of metals Cr, Fe, Mn, and Zn, and the group of oxides of Ce, Cr, Co, Cu, Fe, V, and Zn.

28. The apparatus of claim 1, wherein the farthest downstream of the at least two sections comprises a vertical bubble column reactor through which the aqueous medium and the oxygen containing medium run from bottom to top synchronously.

29. A process for oxidizing an aqueous medium containing organic or oxidizable inorganic substances at increased temperatures and increased pressure in a tubular reactor which is divided into at least two sections connected one behind the other without significant production of water vapor, comprising the steps of:

introducing the aqueous medium and an oxygen containing medium into an introduction area of a first section of the tubular reactor for exposing the aqueous medium to gaseous oxygen to reduce the chemical oxygen demand of the aqueous medium to a predetermined level;

running the mixture of the aqueous medium and the oxygen containing medium through the first section and other downstream ones of the at least two sections one after another;

dispersing oxygen bubbles in the mixture using a bubble dispersing element at least in a farthest upstream section of the tubular reactor;

extracting the mixture from a farthest downstream section of the tubular reactor;

limiting the degree of back-mixing in each of the at least two sections such that the degree of back-mixing in any one of the at least two sections is equal to or less than that of an immediately adjacent upstream section and such that the degree of back-mixing in the farthest downstream section is smaller than the degree of back-mixing in the farthest upstream section; and adjusting a length of time that the mixture spends in each section such that the chemical oxygen demand is reduced to a predetermined desired level for each section.

30. The process of claim 29, wherein the step of limiting comprises limiting the degree of back-mixing in each of the at least to sections such that the degree of back-mixing in any one of the at least two sections is equal to or less than that of the immediately adjacent upstream section.

31. The process of claim 29, wherein the process is performed in the tubular reactor and tubular reactor comprises two sections.

32. The process of claim 29, further comprising the step of recycling a portion of the mixture in the first section through a recycling loop such that the portion of the mixture is introduced back to the first section in the vicinity of the introduction area.

33. The process of claim 32, wherein said step of recycling further comprises recycling a portion that is greater than half of the entire flow through the first section.

34. The process of claim 29, further comprising the step of advancing the mixture from any one of the at least two sections to an immediately adjacent downstream section which is in a separate housing through a tubular conduit.

35. The process of claim 29, further comprising the step of advancing the mixture from any one of the at least two sections to an immediately adjacent downstream section positioned in a common housing through a separator, wherein the separator operatively allows unimpeded flow in the longitudinal direction and substantially suppresses other flow directions.

36. The process of claim 29, further comprising the step of maintaining the mixture within a temperature range of 200° C. to 370° C. and within a pressure range of 20 bar to 200 bar when the mixture is in the tubular reactor.

37. The process of claim 29, wherein said step of dispersing oxygen bubbles comprises arranging flow bodies in the farthest upstream section such that the mixture flowing through the farthest upstream section impacts the flow bodies.

38. The process of claim 29, further including the step of introducing a fresh oxygen containing mixture in one of the at least two sections which follows the first section.

39. The process of claim 29, wherein said step of exposing the aqueous medium to gaseous oxygen further comprises introducing the aqueous medium and ozone into the introduction area of the first section of the tubular reactor.

40. The process of claim 29, further comprising the step of introducing a catalyst which promotes the desired reaction into the first section of the tubular reactor, wherein said catalyst is formed from a compound of one or more of the group of metals Cr, Fe, Mn, and Zn, and the group of oxides of Ce, Cr, Co, Cu, Fe, V, and Zn.

41. The process of claim 40, wherein said step of introducing a catalyst further comprises introducing the catalyst into the first section as one of a suspension and a solution.

* * * * *